United States Patent

Sugita et al.

[11] Patent Number: 5,870,636
[45] Date of Patent: Feb. 9, 1999

[54] RANGEFINDING DEVICE FOR CAMERA

[75] Inventors: Yukihiko Sugita, Kokubunji; Kazumi Ito, Mitaka, both of Japan

[73] Assignee: Olympus Optical Co., Ltd., Tokyo, Japan

[21] Appl. No.: 924,750

[22] Filed: Sep. 5, 1997

[30] Foreign Application Priority Data

Sep. 9, 1996 [JP] Japan .................................. 8-238078

[51] Int. Cl.$^6$ .............................. G03B 13/36; G01C 3/08
[52] U.S. Cl. .......................... 396/106; 396/111; 356/3.03
[58] Field of Search ................... 396/106, 109, 396/110, 111, 120; 356/3.01–3.08

[56] References Cited

U.S. PATENT DOCUMENTS 4,514,083  4/1985  Fukuoka ................................ 396/106

FOREIGN PATENT DOCUMENTS 4-305608  10/1992  Japan .

*Primary Examiner*—W. B. Perkey
*Attorney, Agent, or Firm*—Louis Weinstein

[57] ABSTRACT

A rangefinding device for a camera, in which a light projecting unit for projecting near-infrared light to an object and a light receiving unit for receiving object-reflected light reflected from an object are provided in such a manner as to be nearly in parallel with each other. The light receiving unit is provided with: a prism having a total reflection surface for reflecting almost all of object-reflected light having been incident thereon; and a light receiving element for receiving object-reflected light that is reflected by this total reflection surface of the prism. Further, the total reflection surface of the prism is formed so that a sum of an angle of incidence and an angle of reflection of object-reflected light reflected by the total reflection surface of this prism is greater than 90° degrees.

16 Claims, 4 Drawing Sheets

RANGEFINDING DEVICE FOR CAMERA

BACKGROUND OF THE INVENTION

1. Field of the Invention

This invention generally relates to a rangefinding (or distance-measuring) device for a camera and, more particularly, to a rangefinding device for a camera, in which light projecting means for projecting near-infrared light to an object and light receiving means for receiving object-reflected (or catoptric object) light reflected from an object are provided in such a manner as to be nearly in parallel with each other.

2. Description of the Related Art

Hitherto, there have been proposed and put to practical (or actual) use various rangefinding devices of what is called the active type for camera, which measures a distance therefrom to an object by projecting light, such as near-infrared light, emitted by a light projecting (or emitting) device onto the object through a light projecting lens for autofocusing (AF) and by then leading light reflected from the object to a light receiving device through a light receiving lens for autofocusing (AF) and a prism.

For example, a rangefinding device for a camera, which is disclosed in the Japanese Unexamined Patent Publication No. 4-305608/1992 Official Gazette, is of the active type that has a reflecting means, such as a mirror and a prism, having a reflection surface for reflecting an optical path axis in a direction parallel to a base line drawn between a light projecting portion and a light receiving portion is provided in an optical system composing the light projecting and receiving portions, thereby leading the object-reflected light to the light receiving device.

Thereby, without decreasing a base line length of a rangefinding device, the placement of members, such as the rangefinding device, can be simply arranged in such a manner that other members and mechanisms provided in a camera do not interfere with the object-reflected light. Consequently, the effective utilization of a space in the camera can be achieved. Further, because the base line length is not reduced, the accuracy in measuring a distance by a rangefinding device is not degraded.

However, according to technical means disclosed in the Japanese Unexamined Patent Publication No. 4-305608/1992 Official Gazette, in the case that the aforementioned reflecting means is formed with a prism, total reflection conditions determined by the reflection surface of this prism are not completely satisfied.

Namely, in the case that the aforesaid reflection means is formed with a prism, not all of the object light impinging upon the prism is reflected by the reflection surface of this prism onto the light receiving device, with the result that not all of the object light impinging upon the prism is led to the light receiving device. Thus, this conventional rangefinding device has a problem in that the light receiving accuracy of the light receiving element thereof is not good.

Further, in the case that the aforementioned reflecting means is formed with a mirror, the reflectance (factor) thereof is low and thus the device is not efficient. Consequently, it is difficult to ensure high rangefinding accuracy. This conventional device has problems in that serious reflection loss is incurred when the object is located far away therefrom and that it is difficult to secure the high rangefinding accuracy.

Thus, it has been suggested that, for instance, evaporation (or sputtering) of gold is performed on the reflection surface of the aforementioned reflecting means (such as a prism and a mirror) so as to increase the reflectance of the reflection surface thereof and enhance the rangefinding accuracy. However, in such a case, the manufacturing cost of the rangefinding device (or of the camera) increases.

Furthermore, in the case of employing the technical means described in the aforementioned Japanese Unexamined Patent Publication No. 4-305608/1992 Official Gazette, the optical path axis is reflected in a direction that is parallel to the base line connecting the light projecting portion with the light receiving portion, so that the flexibility in placing the light receiving element in the camera is lost. Therefore, such a layout is not advantageous in placing members in a camera. Namely, in the case of the conventional device, the efficient placement of members thereof in the camera cannot be achieved. In some cases, the size of the camera itself becomes large due to the placement of the members of the rangefinder device.

SUMMARY OF THE INVENTION

Accordingly, a first object of the present invention is to provide an autofocusing (AF) type rangefinding (or distance-measuring) device for a camera, which can secure high rangefinding accuracy by efficiently leading (object-reflected) light reflected from an object to light receiving means and which also can contribute to the miniaturization (or reduction in size) of the camera by ensuring the flexibility in placing each composing member thereof in the camera.

Further, a second object of the present invention is to provide a rangefinding device for a camera, which can contribute to the miniaturization of the camera using the device by contriving the shapes of members thereof and shortening a base line length without degradation in the rangefinding accuracy, and reducing the size of the device itself.

Furthermore, a third object of the present invention is to provide a rangefinding device for a camera, which can improve the assembling precision by contriving the shapes of composing members of light receiving means, and also can realize the simplification of an assembling process thereof by decreasing the number of components or parts, thereby reducing the manufacturing cost thereof.

In brief, to achieve the foregoing objects, in accordance with this invention, there is provided a rangefinding device for a camera, in which light projecting means for projecting near-infrared light to an object and light receiving means for receiving (object-reflected) light reflected from an object are provided in such a manner as to be nearly in parallel with each other, wherein the aforesaid light receiving means comprises: a prism having a total reflection surface for reflecting almost all of the object-reflected light having been incident thereon; and a light receiving element for receiving object-reflected light that is reflected by this total reflection surface of the aforesaid prism, and wherein the total reflection surface of the aforesaid prism is formed so that a sum of an angle of incidence and an angle of reflection of object-reflected light reflected by the total reflection surface of this prism is more than 90 degrees.

Further, in the case of an embodiment of this rangefinding device, the aforesaid prism is provided with a groove portion which has a V-shaped section and is formed in a part of a surface (portion) facing the aforesaid total reflection surface (portion) thereof. Moreover, this V-like groove portion prevents the object-reflected light from being directly incident on the aforesaid light receiving element.

Thus, in the case of the rangefinding device of the present invention, because the total reflection surface of the prism is formed in such a manner that a sum of an angle of incidence and an angle of reflection of object-reflected light reflected by the total reflection surface of the prism is more than 90 degrees, nearly all of the incident object-reflected light is reflected onto the light receiving element. Consequently, the rangefinding accuracy is enhanced.

Moreover, in the case of the embodiment of this rangefinding device of the present invention, the object-reflected light is prevented by the V-like groove portion, which is provided in the aforesaid prism, from being directly incident on the light receiving element. Consequently, degradation in the rangefinding precision is prevented.

Thus, in accordance with the present invention, high rangefinding (or distance-measuring) accuracy is ensured by efficiently leading (object-reflected) light, which is reflected by an object, to light receiving means in a rangefinding device for a camera. Moreover, the flexibility in placing component (or composing) members of a rangefinding device in a camera is secured. Consequently, there can be provided a rangefinding device for a camera, which contributes to a reduction in size of the camera.

Other features, objects and advantages of the present invention will become further apparent from the following description of a preferred embodiment with reference to the drawings in which like reference characters designate like or corresponding parts throughout several views.

DETAILED DESCRIPTION OF THE PREFERRED EMBODIMENT

Hereinafter, the preferred embodiment of the present invention will be described in detail by referring to the accompanying drawings.

Figure 1:
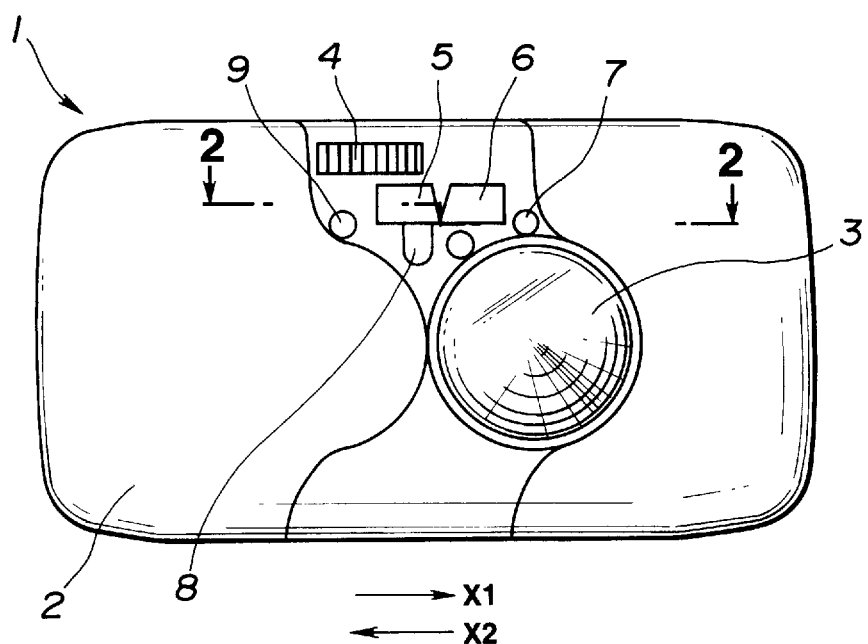
FIG. 1 is a front view of a camera to which a rangefinding device embodying the present invention, namely, an embodiment of the present invention is applied.

As shown in FIG. 1, on the front surface of a camera 1 to which a rangefinding device (namely, this embodiment) of the present invention is applied, there are provided a slide barrier (or cover) 2 which is slidably mounted on the left-hand half thereof (as viewed in FIG. 1), and the following members to be exposed to the outside of the camera 1 when this slide barrier 2 is opened (namely, this slide barrier 2 is in a condition illustrated in FIG. 1): namely, an imaging optical system 3 including an imaging lens (namely, a photographing or shooting lens) and a lens barrel; a stroboscopic light irradiating window 4 provided in front of a flash emitting device (namely, a stroboscopic lamp (or light source)); a light projecting window for AF 6 composing a part of the light projecting means for projecting near-infrared light onto an object; a light receiving window 5 for AF composing a part of the light receiving means for receiving light reflected from the object (hereunder sometimes referred to as "object-reflected light"); a finder window 7 composing a part of a finder optical system for observing an erected normal image of the object; a light receiving portion 8 for remote control, which is adapted to receive signal light from remote control means (not shown); and a self-timer signal light-emitting-diode (LED) 9 which is operative to blink when using a self-timer or the like, and to generate a signal indicating the use of the self-timer.

Incidentally, the aforementioned slide barrier 2 is slidably provided on the front surface of the camera as above described. In the case that no pictures are taken by this camera 1, namely, during carrying or storing this camera, the front portions of the imaging optical system 3 and the light receiving windows 5 and 6 for AF are covered with this slide barrier 2 by causing this slide barrier 2 to slide and move in a direction of an arrow X1 in FIG. 1. Thereby, the slide barrier 2 serves to protect each of these members. Further, in the case of taking pictures by this camera, the slide barrier 2 is slid and moved in a direction of an arrow X2 in FIG. 1, so that the imaging optical system 3 and the light receiving windows 5 and 6 are exposed to the outside of the camera 1.

The aforementioned sliding operation of the slide barrier 2 is linked with, for example, a power supply switch (not shown). Thereby, ON/OFF operations, namely, operations of turning on/off of the main power supply of the camera 1 can be achieved.

Namely, the main power supply is turned on (namely, is put into an ON-state) by causing the slide barrier 2 to slide and move in an opening direction (namely, in the direction of the arrow X2). In contrast, the main power supply is turned off (namely, is put into an OFF-state) by causing the slide barrier 2 to slide and move in a closing direction (namely, in the direction of the arrow X1).

Incidentally, FIG. 1 illustrates the state of the camera 1 in which the slide barrier 2 is opened (namely, illustrates the state of the camera 1 when used.

Next, the detailed configuration of this rangefinding device for the camera, namely, this embodiment of the present invention will be described hereinbelow with reference to FIG. 2.

Figure 2:
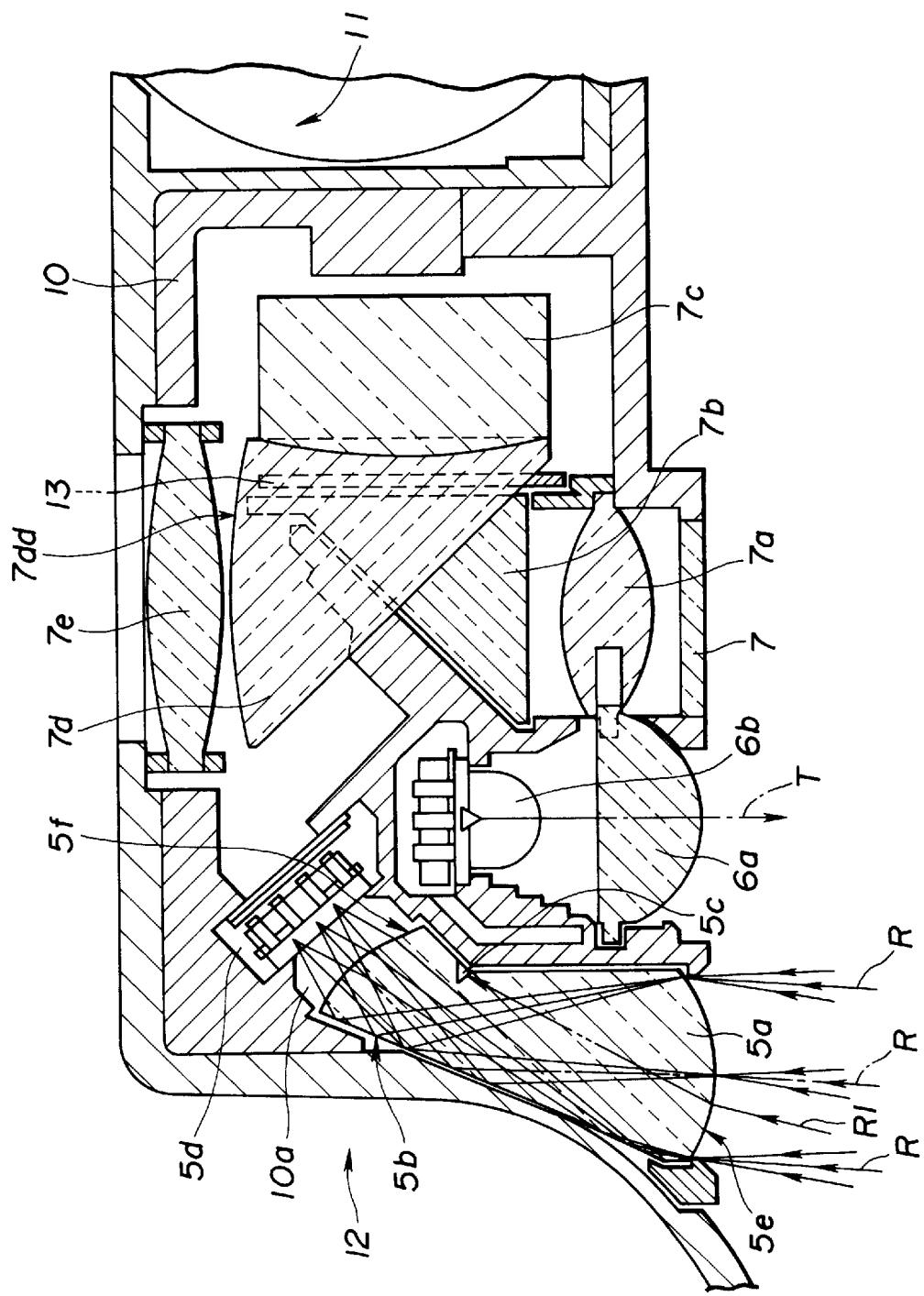
FIG. 2 is an enlarged transverse sectional view of a primary part of the camera, which is taken along line 2—2 of FIG. 1.

FIG. 2 is a diagram showing the vicinity of this rangefinding device, namely, this embodiment of the camera in detail, and is an enlarged transverse section view of a primary part of the camera, which is taken along line 2—2 of FIG. 1, as above stated. Incidentally, in this figure, for simplicity of drawing, members relating to the present invention, namely, only the primary members provided in the rangefinding device are shown. Thus, other composing members provided in the camera are omitted.

As shown in FIG. 2, the rangefinding device for the camera in the case of this embodiment is mounted on the top portion of a main unit 10 of the camera 1, which is sandwiched between a film spool chamber 11 provided in an end portion of the camera 1 and what is called a film patrone chamber (namely, a film cartridge chamber) 12 provided in the other end portion thereof.

On the top portion of the main unit 10 of the camera 1, a finder optical system is placed close to the spool chamber 11, while the rangefinding device composed of the light projecting means and the light receiving means is placed close to the film cartridge chamber 12.

The aforementioned rangefinding device comprises: the light projecting means consisting of a light projecting element 6b constituted by a light emitting element (or device) such as an infrared-emitting diode (IRED), a light projecting lens 6a for AF, which is operative to collect near-infrared light emitted from this light projecting element 6b and project this near-infrared light onto an object, and a light projecting window (not shown in FIG. 2 (see reference numeral 6 in FIG. 1)) for AF, which is operative to protect the front side of this light projecting lens 6a for AF; and the light receiving means consisting of a light receiving prism 5a for AF, which is a light receiving element on which object-reflected light that is projected from this light projecting means and is then reflected by an object, a light receiving element 5d for receiving the object-reflected light having been incident on this the light receiving prism 5a for AF, and a light receiving window (not shown in FIG. 2 (see reference numeral 5 in FIG. 1)) for AF, which is operative to protect the front side of the light receiving prism 5a.

The aforementioned light receiving prism 5a for AF has a light receiving lens portion 5e provided on the front side thereof and also has a total reflection surface 5b constituted by a planar reflection surface which is operative to reflect nearly all of object-reflected light having been incident upon this light receiving lens portion 5e and is formed on a side surface thereof.

Moreover, a front part of the aforesaid light projecting lens 6a for AF and a front part of the light receiving lens portion of the aforesaid light receiving prism 5a are placed in such a manner as to face the front (namely, the object-side) of the camera and to be nearly parallel to each other.

Furthermore, a total reflection surface 5b of the aforementioned light receiving prism 5a for AF is constituted by a reflection surface, which is placed behind the aforementioned light receiving lens portion 5e and is inclined to the rear of the aforesaid light projecting element 6b, and is placed in the proximity of the outer wall of the aforementioned film cartridge chamber 12.

Figure 4:
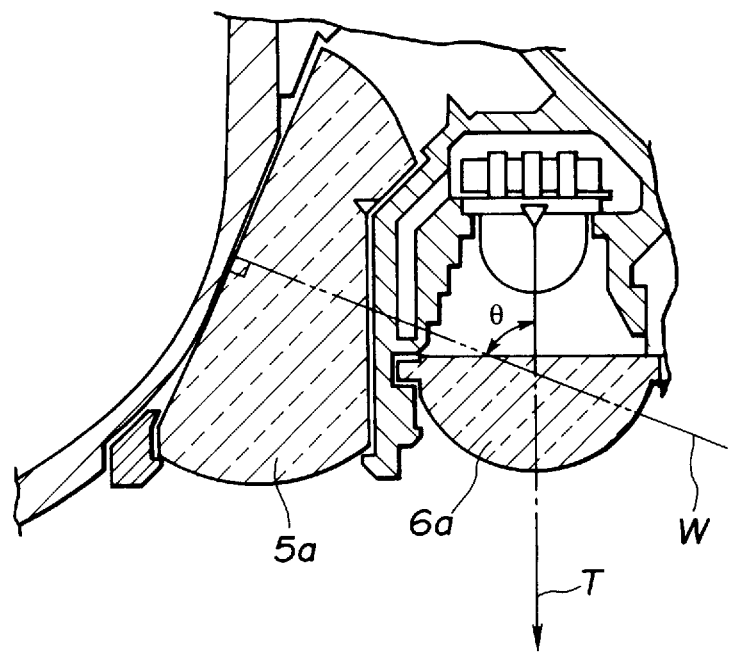
FIG. 4 is a diagram for showing the vicinity of a light receiving prism for AF of the rangefinding device of FIG. 2 and for illustrating conditions for placement of a total reflection surface of this prism.

Additionally, the aforesaid prism 5a is placed in such a manner that a smaller one of angles of intersection of a line orthogonal to the aforesaid total reflection surface 5b (namely, a normal W to the total reflection surface 5b) and an optical axis of the light projecting element 6b extending from the central position of the aforesaid light projecting element 6b (namely, a light projecting path T of the near-infrared light emitted from the aforementioned light projecting element 6b) is not less than 45 degrees (see FIG. 4).

Most of the incidence-side part of a surface facing the aforesaid total reflection surface 5b is formed in such a manner as to be parallel to the prism optical axis but becomes a slope, which is inclined to the side of the light projecting element 6b, from the vicinity thereof.

Further, such a surface is placed in such a manner as to be inclined to the frontward and backward directions of the camera 1 so that a sum of an angle of incidence and an angle of reflection of object-reflected light at the total reflection surface 5b of the aforementioned prism 5a is an obtuse angle which is more than 90 degrees.

Figure 5:
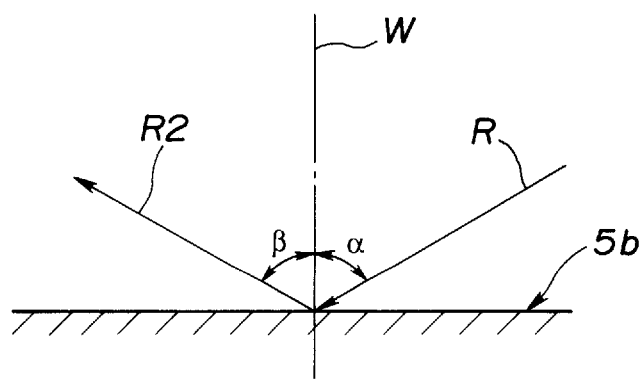
FIG. 5 is a conceptual diagram for illustrating an angle of incidence and an angle of reflection of object-reflected light onto the total reflection surface of the light receiving prism for AF of the rangefinding device of FIG. 2.

Incidentally, an "angle of incidence of object-reflected light" referred herein is defined as an angle α which the locus R of an incident ray of the object-reflected light onto the total reflection surface 5b forms with a line orthogonal to the aforesaid total reflection surface 5b (namely, the normal W), as illustrated in FIG. 5. Further, an "angle of reflection of object-reflected light" referred herein is defined as an angle β which the locus R2 of a reflected ray of the object-reflected light reflected by the total reflection surface 5b forms with the normal W orthogonal to the aforesaid total reflection surface 5b, as illustrated in FIG. 5.

Namely, the aforementioned total reflection surface 5b is disposed so that α+β> (angle of) 90 degrees.

Further, the light receiving prism 5a for AF is provided with a V-like groove portion 5c, whose section is shaped like a letter "V", at a position where a surface of this prism changes from a part of the surface facing the total reflection surface 5b (namely, a surface parallel to the prism optical axis) to a part of the surface which is inclined toward the side of the light projecting element 6b. This V-like groove portion 5c is provided in order to prevent object-reflected light from being directly incident on the light receiving element 5d (corresponding to an optical path indicated by an arrow R1 in FIG. 2).

Incidentally, the light receiving prism 5a for AF is fixedly attached to the top portion of the main unit 10 of the camera 1 with an adhesive. In this case, a non-reflecting adhesive, such as a black adhesive, is used as an adhesive agent for bonding the bottom surface of the light receiving prism 5a for AF to the prism adhesion surface 10a of the main unit 10 of the camera 1 so as to prevent an occurrence of an internal reflection in the light receiving prism 5a for AF.

Further, an exit end surface 5f of the aforesaid light receiving prism 5a for AF placed in this manner is formed on a condensing lens in such a way as to cause reflection light to exit to the rear of the light projecting element 6b. The light receiving element 5d is placed in such a manner as to face this exit end surface 5f.

Namely, the light receiving element 5d is placed in such a way as to be inclined diagonally (or obliquely) behind the light projecting element 6b as shown in FIG. 2. Further, the light receiving surface of the aforesaid light receiving element 5d is placed in such a way as to be inclined at a predetermined angle to the optical axis of incident light which is incident upon the imaging optical system 3 composed of the imaging lens and so on of the camera 1.

Incidentally, in FIG. 2, reference character T designates a light projecting path (namely, an optical path) of near-infrared light emitted from the light projecting element 6b; and R and R1 conceptually denote optical paths of object-reflected light.

Figure 3:
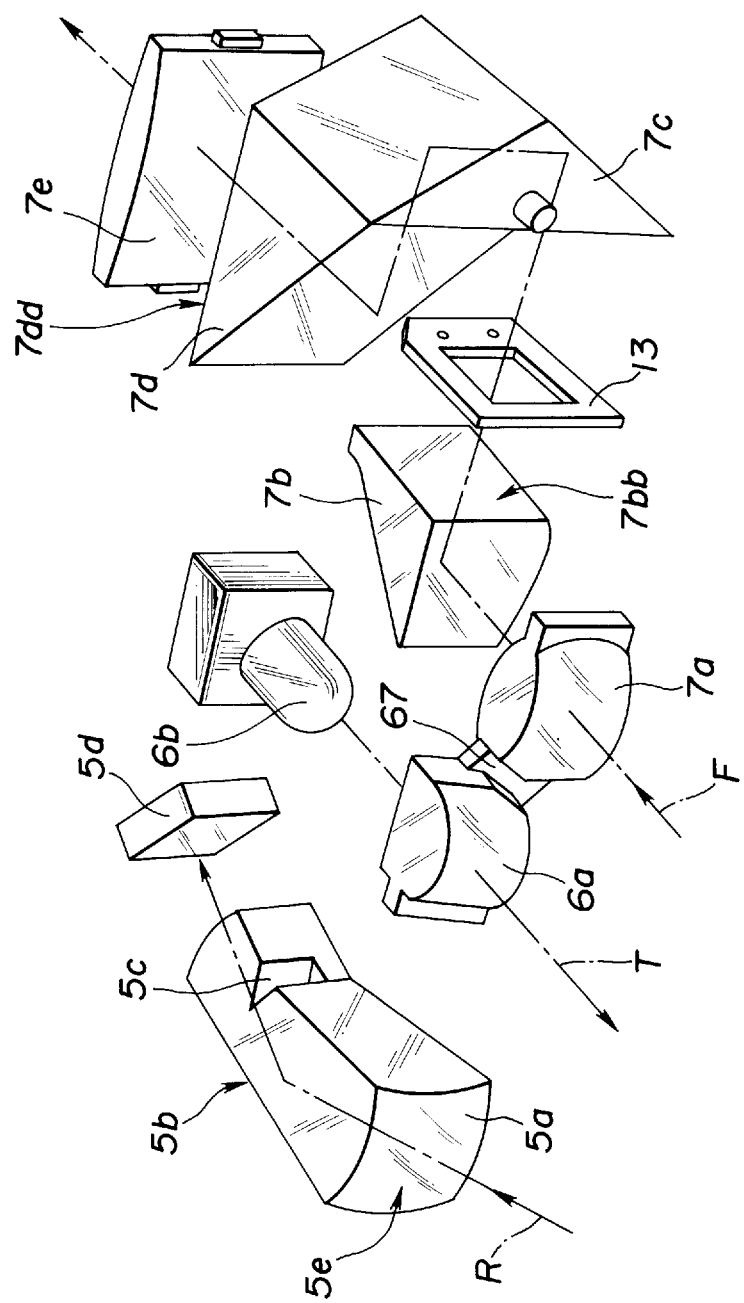
FIG. 3 is an exploded perspective diagram illustrating primary members of the rangefinding device embodying the present invention.

Meanwhile, as illustrated in FIGS. 2 and 3, the finder optical system of this camera 1 is provided above the aforementioned imaging optical system 3 (see FIG. 1) on a side opposite to the light receiving prism 5a across the aforesaid light projecting lens 6a. Further, this finder optical system consists of: an objective lens 7a; a first prism 7b constituted by a right-angle prism for deflecting a finder optical path F to the side; a second prism (7c, 7d) composed of a prism portion 7c, which is provided in such a manner as to face an exit surface 7bb of this first prism 7b and is constituted by a triangular prism for upwardly deflecting the finder optical path and then deflecting this finder optical path laterally and is formed in such a manner as to be integral with a prism portion 7d constituted by a triangular prism for deflecting the finder optical path backwardly; an ocular lens 7e provided in such a way as to face the exit surface of the prism portion 7dd of this second prism; the aforesaid finder window 7 (not shown in FIG. 3) for protecting the aforementioned objective lens 7a; and what is called a finder mask 13 provided between the aforementioned first and second prisms.

In this way, the first prism 7b and the second prism (7c, 7d) are configured so that the finder optical path of light, which is incident on the objective lens 7a through the aforesaid finder window 7 and is used to form an image of the object, is deflected and is further led to the ocular lens 7e. Thereby, the image of the object is reduced in size and is able to be observed as an erected normal image.

Further, as illustrated in FIG. 3, the objective lens 7a of the aforementioned finder optical system is formed in such a manner as to be integral with the aforementioned light projecting lens 6a for AF through a connecting (or coupling) piece 67. When viewed from the front thereof, the optical axis center F of the objective lens 7a of the finder optical system is established in such a way as to be placed under the optical axis center F of the light projecting lens 6a for AF.

Moreover, as illustrated in FIG. 2, the top part of the front side of the objective lens 7a of the finder optical system is provided in such way as to be slightly behind the top part of the front side of the light projecting lens 6a for AF.

Furthermore, the aforementioned finder mask 13 is placed between the first prism 7b and the second prism (7c, 7d). The screen frame of this finder mask 13 is set so that an image of the object in a range, which is nearly equal to the imaging range of the imaging optical system 3, can be observed.

Incidentally, an arrow F described in FIG. 3 conceptually indicates a finder optical path of light transmitted by the finder optical system. Similarly as in FIG. 2, an arrow T described in FIG. 3 conceptually indicates a light projecting path of near-infrared light; and an arrow R conceptually indicates an optical path of light reflected by an object.

An operation of the aforementioned rangefinding device for the camera, which is an embodiment of the present invention and is constructed as above described, will be described hereinbelow.

When the slide barrier 2 is put into the opening state (namely, the state illustrated in FIG. 1) and the main power supply of the camera 1 is in an ON-state, a rangefinding (or distance-measuring) operation is commenced by operating an operation button such as a shutter release button (not shown) of the camera 1.

This rangefinding operation is started by first emitting near-infrared light from the light projecting element 6b. Then, this near-infrared light is condensed by the light projecting lens 6a for AF. Further, the near-infrared light is projected onto an object through the light projecting window for AF.

Furthermore, the near-infrared light projected by this light projecting element 6b is reflected by the object. Subsequently, this near-infrared light is incident on the light receiving prism 5a for AF, as object-reflected light. Almost all of object-reflected light having been incident on this light receiving prism 5a for AF is reflected by the total reflection surface 5b of the light receiving prism 5a for AF to the light receiving element 5d and is thus received by this light receiving element 5d.

Incidentally, at that time, a part of the object-reflected light, which is incident upon the light receiving prism 5a for AF, and other external light attempt to be directly incident on the light receiving prism 5a for AF. However, such a part of the object-reflected-light is shielded by the V-like groove portion 5c and is thus not directly incident thereon.

As above described, in accordance with this embodiment, nearly all of the object-reflected light, which is incident on the light receiving prism 5a for AF, can be efficiently led to the light receiving element 5d. In addition, the direct incidence of object-reflected light onto the light receiving element 5d is prevented by providing the V-like groove portion 5c therein. Thus, an error of measurement of a distance is reduced. Moreover, this invention can contribute to the enhanced rangefinding (or distance-measuring) accuracy. Therefore, the base line length can be shortened without degrading the rangefinding accuracy. Furthermore, this invention is very advantageous in decreasing the lateral size or width of the camera.

Further, because a sum of an angle of incidence and an angle of reflection of object-reflected light at the total reflection surface 5b of the aforementioned prism 5a is an obtuse angle which is more than 90 degrees, the flexibility in placing the light receiving element 5d can be secured. Thus, the members of the rangefinding device can be efficiently placed in the camera. Consequently, this invention contributes to the reduced size of the camera.

Additionally, as a result of using the prism (5a) in which the light receiving lens (5e) is formed in such a manner as to be integral with the reflection surface (5b), the possibility of an occurrence of the assembling error, which occurs when the light receiving lens is formed separately from the reflection surface in the light receiving means, can be eliminated. Therefore, the tolerance at the time of assembling the camera is not accumulated. Consequently, the present invention can contributed to the improved assembling precision. Moreover, the present invention can contribute to a simplified assembling process. In addition, the manufacturing cost of the device can be reduced.

In this invention, it is apparent that working modes different in a wide range can be formed on the basis of this invention without departing from the spirit and scope of the invention. This invention is not restricted by any specific embodiment except as maybe limited by the appended claims.

What is claimed is:

1. A rangefinding device for a camera, comprising: a prism having a lens portion at least one of an incident surface receiving light reflected from an object and an exit surface and having a total reflection surface which reflects light reflected from a image entering said prism said reflection surface formed so that a sum of an angle of incidence and an angle of reflection of object-reflected light is more than 90° degrees from said reflection surface; and a light receiving element for receiving object-reflected light that is reflected by said prism and exits through said exit surface.

2. The rangefinding device for a camera, according to claim 1, wherein a light receiving surface of said light receiving element is inclined at a predetermined angle to an incident optical axis of an imaging lens.

3. The rangefinding device for a camera, according to claim 2, wherein the predetermined angle is an angle at which nearly all of luminous fluxes of light reflected from a reflection surface of said prism are able to be received by said light.

4. A rangefinding device for a camera, comprising:

a prism having a reflection surface formed so that a sum of an angle of incidence and an angle of reflection of object-reflected light is more than 90° degrees; and a light receiving element for receiving object-reflected light that is reflected by said prism said prism having a groove portion that is provided at a position facing said reflection surface for preventing light, which is reflected from an object, from being incident directly upon said light receiving element.

5. The rangefinding device for a camera, according to claim 4, wherein a section of said groove portion is shaped like a letter "V".

6. A rangefinding device for a camera, comprising:

light projecting means for projecting near-infrared light onto an object;

a prism having a lens portion at at least one of an incident surface receiving light reflected from an object and an exit surface and having a reflection surface which reflects light reflected by an image and entering said prism, said reflection surface being formed so that a sum of an angle of incidence and an angle of reflection of object-reflected light, which is reflected from the object, is more than 90° degrees; and a light receiving element for receiving object-reflected light that is reflected by said prism and exiting from said exit surface.

7. (Amended) The rangefinding device for a camera, according to claim 6, wherein said light projecting means comprises:

a light projecting lens provided in such a manner as to have it central axis nearly parallel with a forward portion of said prism; and a light projecting element for emitting near-infrared light.

8. The rangefinding device for a camera, according to claim 6, wherein said light receiving element is placed diagonally behind said light projecting element.

9. The rangefinding device for a camera, according to claim 7, wherein said prism has a groove portion that is provided at a position facing said reflection surface for preventing light, which is reflected from the object, from being incident directly upon said light receiving element.

10. The rangefinding device for a camera, according to claim 9, wherein a section of said groove portion is shaped like a letter "V".

11. A rangefinding device having a finder optical system for a camera, comprising:

a light projecting lens formed in such a manner as to be integral with a predetermined lens provided in said finder;

a light projecting element for projecting near-infrared light onto an object through said light projecting lens;

a prism which is substantially parallel to said light projecting lens and has a reflection surface formed so that a sum of an angle of incidence and an angle of reflection of object-reflected light is an obtuse angle; and a light receiving element which is placed diagonally behind said light projecting element and receives object-reflected light that is reflected by said prism.

12. The rangefinding device according to claim 11, wherein said prism has a groove portion that is provided at a position facing said reflection surface for preventing light, which is reflected from the object, from being incident directly upon said light receiving element.

13. The rangefinding device for a camera, according to claim 12, wherein a section of said groove portion is shaped like a letter "V".

14. A rangefinding device for a camera, comprising:

light projecting means for projecting light onto an object, said light projecting means having a light emitting element for emitting light and a light projecting lens for projecting the emitted light onto an object; and light receiving means for receiving light reflected from an object, said light receiving means comprising a light receiving element for receiving light reflected from an object and a light-receiving optical element, said light receiving element being placed nearly behind said light emitting element, said light-receiving optical element having a forward portion placed adjacent to a side of said light receiving element and an integral rearward portion inclined at an angle to said forward portion.

15. A rangefinding device for a camera according to claim 1 wherein the prism is a unitary, one-piece member.

16. A rangefinding device for a camera according to claim 14 wherein said light-receiving optical element is a prism having a lens portion formed at at least one of an incident surface and an exit surface.

* * * * *